United States Patent
Hause et al.

(10) Patent No.: US 12,303,861 B1
(45) Date of Patent: May 20, 2025

(54) METHOD FOR MANUFACTURING SORBENT COMPOSITIONS WITH ENHANCED ADSORPTION PROPERTIES

(71) Applicant: Lithos Industries Inc., Fort Worth, TX (US)

(72) Inventors: Sarah Hause, Fort Worth, TX (US); Hood H. Whitson, Fort Worth, TX (US)

(73) Assignee: Lithos Industries Inc., Fort Worth, TX (US)

( * ) Notice: Subject to any disclaimer, the term of this patent is extended or adjusted under 35 U.S.C. 154(b) by 0 days.

(21) Appl. No.: 18/619,106

(22) Filed: Mar. 27, 2024

(51) Int. Cl.
*B01J 20/04* (2006.01)
*B01J 20/30* (2006.01)

(52) U.S. Cl.
CPC .......... *B01J 20/041* (2013.01); *B01J 20/3078* (2013.01); *B01J 20/3085* (2013.01); *B01J 2220/42* (2013.01); *B01J 2220/4806* (2013.01)

(58) Field of Classification Search
CPC .. B01J 20/041; B01J 20/3078; B01J 20/3085; B01J 2220/42; B01J 2220/4806
USPC ...................................................... 502/400
See application file for complete search history.

(56) References Cited

FOREIGN PATENT DOCUMENTS

WO    WO-2022120494 A1 * 6/2022 ............ B01J 20/041

OTHER PUBLICATIONS

Zhang et al., "Research Development on Spinel Lithium Manganese Oxides Cathode Materials for Lithium-Ion Batteries", Journal of the Electrochemical Society, 2023 170 090532. (Year: 2023).*

Karshyga et al., "Synthesis of Manganese Oxide Sorbent for the Extraction of Lithium from Hydromineral Raw Materials", Materials 2023,16, 7548. (Year: 2023).*

* cited by examiner

*Primary Examiner* — Anita Nassiri-Motlagh
(74) *Attorney, Agent, or Firm* — Bryan A. Santarelli; FisherBroyles, LLP

(57) ABSTRACT

Embodiments of the present disclosure may include the synthesis of a sorbent spinel material, which can be essential for applications necessitating specific chemical attributes and high lithium loading capacities. The disclosure includes preparing a precursor blend from specific reactants, including manganese compounds, and calcining the precursor blend at a determined temperature and duration to form an intermediate blend with desired constituents at specific ratios. In some embodiments, cooling and milling may be performed to achieve the final product. In some embodiments the process involves adjusting the reaction conditions to bias the composition of the intermediate blend, which may include different proportions of $Mn_3O_4$, $Mn_2O_3$, and lithium manganese oxide (LMO), resulting in variable lithium loading capacities (9.0 to 23.0 mg/g of LMO) when higher-quality reactants are used.

15 Claims, 11 Drawing Sheets

| Temperature in Degrees Celsius (Duration: 5 hrs) | LMO (%) | $Mn_2O_3$ (%) | $Mn_3O_4$ (%) | $LiOH \cdot H_2O$ (%) |
|---|---|---|---|---|
| 400 | 11.51 | 6.98 | 77.41 | 4.11 |
| 450 | 7.08 | 12.81 | 78.07 | 2.04 |
| 500 | 90.62 | 9.04 | 0.34 | 0 |
| 525 | 94.42 | 5.58 | 0 | 0 |
| 550 | 82.6 | 17.4 | 0 | 0 |
| 600 | 72.2 | 23.98 | 2.21 | 1.62 |
| 650 | 74.34 | 25.66 | 0 | 0 |

All compound values represent the weight % phase composition as determined by Rietveld refinement of XRD data.

*FIG. 6*

| Time in Hours (Temperature: 525C) | LMO(%) | $Mn_2O_3$(%) | $Mn_3O_4$ (%) | $LiOH \cdot H_2O$ (%) |
|---|---|---|---|---|
| 0.5 | 55.5 | 7.04 | 37.19 | 0.26 |
| 1 | 69.02 | 15.69 | 11 | 4.3 |
| 2 | 84.36 | 15.64 | 0 | 0 |
| 5 | 94.42 | 5.58 | 0 | 0 |
| 8 | 78.79 | 20.66 | 0.08 | 0.47 |
| 15 | 83.54 | 16.46 | 0 | 0 |

All compound composition values represent the weight % phase composition as determined by Rietveld refinement of XRD data.

*FIG. 7*

| First Fire (°C) | First Duration (Hrs) | Second Fire (°C) | Second Duration (Hrs) | LMO (%) | $Mn_2O_3$ (%) | $Mn_3O_4$ (%) | $LiOH \cdot H_2O$ (%) |
|---|---|---|---|---|---|---|---|
| 400 | 5 | 525 | 10 | 76.59 | 23.41 | 0 | 0 |
| 525 | 0.5 | 525 | 0.5 | 63.32 | 25.68 | 10.37 | 0.64 |
| 525 | 0.5 | 525 | 10 | 83.24 | 16.67 | 0.06 | 0.02 |
| 525 | 2 | 525 | 2 | 79.89 | 19.42 | 0.49 | 0.21 |
| 525 | 2 | 525 | 10 | 89.82 | 8.92 | 1.26 | 0 |
| 525 | 5 | 525 | 10 | 91.38 | 8.09 | 0 | 0.53 |
| 525 | 5 | 525 | 10 | 91.38 | 8.09 | 0 | 0.53 |
| 525 | 15 | 525 | 10 | 92.23 | 7.16 | 0.33 | 0.28 |
| 650 | 5 | 525 | 10 | 92.09 | 7.76 | 0 | 0.15 |

Compound composition percentages of intermediate sorbents of calcined undoped precursor blend during different second calcination temperatures and duration.
All compound values represent the weight % phase composition as determined by Rietveld refinement of XRD data.

FIG. 8

| Time in Hours (Temperature: 525 C) | LMO | $Mn_2O_3$ | $Mn_3O_4$ | $LiOH \cdot H_2O$ |
|---|---|---|---|---|
| 0.5 | 83.24 | 16.67 | 0.06 | 0.02 |
| 2 | 89.82 | 8.92 | 1.26 | 0 |
| 5 | 91.38 | 8.09 | 0 | 0.53 |
| 15 | 92.23 | 7.16 | 0.33 | 0.28 |

All compound values represent the weight % phase composition as determined by Rietveld refinement of XRD data.

*FIG. 9*

| No. | Initial Calcination | | Second Calcination | | Loading Capacity (mg/g LMO) |
|---|---|---|---|---|---|
| | Temp. (°C) | Duration (Hours) | Temp. (°C) | Duration (Hours) | |
| 1 | 525 | 0.5 | 525 | 0.5 | 10.2 |
| 2 | 525 | 2 | 525 | 2 | 13.2 |
| 3 | 525 | 2 | 525 | 10 | 9.2 |
| 4 | 525 | 5 | 525 | 10 | 15.9 |
| 5 | 525 | 15 | 525 | 10 | 14.5 |
| 6 | 650 | 5 | 650 | 10 | 6.7 |
| 7* | 525 | 5 | 525 | 10 | 23.9 |

Table 1: First and Second Firing Program

All compound values represent the weight % phase composition as determined by Rietveld refinement of XRD data.

Experiments 1 – 6 use LiOH monohydrate as a lithium source for the reaction, while Experiment 7* uses $Li_2O_3$.

*FIG. 10*

| Grade | Fe (as % of Mn Content) | Initial Calcination (5 hours at 525°C) | | | | Second Calcination (10 hours at 525°C) | | | | Load. Cap. |
|---|---|---|---|---|---|---|---|---|---|---|
| | | LMO | $Mn_2O_3$ | $Mn_3O_4$ | $LiOH \cdot H_2O$ | LMO | $Mn_2O_3$ | $Mn_3O_4$ | $LiOH \cdot H_2O$ | |
| 1 | 2.70 | 53.2 | 6.11 | 38.27 | 2.42 | 78.92 | 11.34 | 6.58 | 3.17 | 5.6 |
| 2 | 1.7 | 46.31 | 3.33 | 46.31 | 1.39 | 81.59 | 6.87 | 6.73 | 4.81 | 6.9 |
| 3 | 0.17 | 94.42 | 5.58 | 0 | 0 | 91.38 | 8.09 | 0 | 0.53 | 15.9 |

Table 1: First and Second Calcination Program of three different Grades of reactant materials 1, 2, and 3. Each reactant material may contain impurities, like iron, in addition to $Mn_2O_3$.

All compound values represent the weight % phase composition as determined by Rietveld refinement of XRD data. Loading capacity is in mg/g of activated LMO.

*FIG. 11*

METHOD FOR MANUFACTURING SORBENT COMPOSITIONS WITH ENHANCED ADSORPTION PROPERTIES

TECHNICAL FIELD

The subject matter herein relates, generally, to manufacturing techniques for Lithium Manganese Oxide (LMO) spinels used in industrial applications for extracting a metal from a metal-containing fluid, and, more particularly, to biasing techniques for manufacturing such compositions in target volumes and with specific loading capacities for targeted metals.

SUMMARY

The subject matter herein relates, generally, to manufacturing techniques for Lithium Manganese Oxide (LMO) spinels used in industrial applications for extracting a metal from a metal-containing fluid and, more particularly, to biasing techniques for manufacturing such compositions in target volumes and with specific loading capacities for targeted metals.

Embodiments of the present disclosure may include a sorbent spinel material obtained by a method including steps of obtaining reactants to form a precursor blend. Embodiments of the present disclosure may also include calcining the precursor blend for an initial calcining duration and first calcining temperature, forming an intermediate-state sorbent blend. Embodiments of the present disclosure may also include cooling the intermediate-state sorbent blend. Embodiments may also include milling the intermediate-state sorbent blend.

In some embodiments, the reactants include at least one high-grade manganese compound. In some embodiments, the manganese compound has a chemical formula of $Mn_3O_4$. In some embodiments, the reactants include at least $MnCO_3$, $Mn_2O_3$, and LiOH monohydrate or $Li_2CO_3$.

In some embodiments, the initial calcining duration may be at least five (5) hours, and the first calcining temperature may be at least 650° C. In some embodiments, the intermediate-state sorbent blend may include at least 4.5% by weight $Mn_2O_3$ and 70% by weight LMO. In some embodiments, the method may further include a second calcining event. In some embodiments of the present disclosure, the second calcining event may include a second calcining temperature of approximately 625° C. In some embodiments, the LMO of the sorbent blend has an activated lithium loading capacity of at least 6.0 mg/g of activated LMO.

In some embodiments, the method may further include a second calcining event. In some embodiments of the present disclosure, the second calcining event may include a second calcining temperature between approximately 500° C. and approximately 550° C. Some embodiments of the present disclosure may include a second calcining duration which is approximately ten (10) hours, and the second calcining may include (e.g., may be at) a temperature between approximately 500° C. and approximately 550° C. In some other embodiments, the second calcining event may include a sorbent blend comprising at least 70% by weight LMO and at least 5.0% by weight $Mn_2O_3$. In some embodiments, the LMO of the sorbent blend has an activated lithium loading capacity of at least 14.0 mg/g of activated LMO.

In some embodiments, the initial calcining duration is between two (2.0) and fifteen (15) hours, and the first calcining temperature is between 500° C. and 550° C. inclusive. In some embodiments, the formed intermediate-state sorbent blend may include at least 70% by weight of LMO and at least 4.5% by weight $Mn_2O_3$. In some other embodiments, the LMO of the sorbent blend has a lithium loading capacity of at least 4.5 mg/g of activated LMO.

Embodiments of the present disclosure may also include a method for manufacturing an LMO sorbent spinel, the method including steps of obtaining a precursor blend. In some embodiments, the precursor blend may be one of a 3.4 molar ratio of lithium to manganese blend of LiOH monohydrate or $Li_2CO_3$ and $Mn_3O_4$ precursor blend.

Embodiments of the present disclosure may also include calcining the precursor blend for an initial calcining duration and at a first temperature. Embodiments of the present disclosure may also include an intermediate-state sorbent blend of at least $Mn_2O_3$ and an LMO formed by calcination. Embodiments may also include calcining the intermediate-state sorbent blend for a second calcining temperature to form a sorbent blend.

In some embodiments, the initial calcining duration may be at least two (2) hours. In some embodiments, the first temperature may be at least 500° C. In some embodiments, the intermediate-state sorbent blend may include less than 2% by weight $Mn_3O_4$, less than 23% by weight $Mn_2O_3$, and at least 75% by weight LMO. In some embodiments, the LMO has a lithium loading capacity of at least 4.5 mg/g of activated LMO.

In some embodiments, the second calcining duration may be at least two (2) hours. In some embodiments, the second calcining temperature may be approximately 525° C. In some embodiments, the sorbent blend may include less than 25% by weight $Mn_2O_3$ and at least 70% by weight LMO. In some embodiments, the LMO has a lithium loading capacity of at least 9.0 mg/g of activated LMO.

In some embodiments, the initial calcining duration may be at least five (5) hours. In some embodiments, the initial calcining temperature may be at least 525° C. In some embodiments, the formed intermediate-sorbent blend may include at least 70% by weight LMO and at least 4.5% by weight $Mn_2O_3$. In some embodiments, the second calcining duration may be approximately five (5) hours, and the second calcining temperature may be at least 525° C. In some embodiments, the sorbent blend may include less than 0.5% by weight LiOH monohydrate, less than 8% by weight $Mn_2O_3$, and at least 92% by weight LMO. In some embodiments, the LMO has a lithium loading capacity of at least 6.7 mg/g of activated LMO.

In some embodiments, the method may include activating the sorbent blend, the activating including mixing the sorbent with an acid. Embodiments of the present disclosure may also include agitating the sorbent and the acid. Embodiments of the present disclosure may also include activating the sorbent for a duration necessary to reach an activation percentage of at least 65% activation to form an activated sorbent.

Embodiments of the present disclosure may also include a method for manufacturing an undoped activated LMO sorbent spinel, the method including steps of obtaining a precursor blend. In some embodiments, the precursor blend may be a 0.70 to 0.85 molar ratio of lithium to manganese, wherein the lithium is supplied by $Li_2CO_3$ and the manganese is supplied by $Mn_3O_4$. Embodiments of the present disclosure may also include calcining the precursor blend for an initial calcining duration and at a first temperature of at least 525° C., forming an intermediate-sorbent blend. Embodiments of the present disclosure may also include the formed intermediate-sorbent blend that may include at least $Mn_2O_3$ and an LMO. Some embodiments of the present disclosure may also include cooling the formed intermediate-sorbent blend. Embodiments of the present disclosure may also include calcining the cooled intermediate sorbent blend for a second calcining duration of five (5) hours and a second temperature of at least 500° C., forming a sorbent blend. Embodiments of the present disclosure may also include activating the formed sorbent blend with an acid. In some embodiments, the activated sorbent blend may include at least one species of HMO sorbent spinel.

Embodiments may also include activating the sorbent blend with an acid. In some embodiments, the activated sorbent blend may include at least one species of hydrogen manganese oxide (HMO) sorbent spinel. Acid activation replaces lithium ions in the LMO structure with hydrogen ions, thus transforming LMO into HMO. The choice of acid and the conditions under which acid activation is performed must be sufficient to leach lithium ions from the LMO lattice without degrading the overall structure of the manganese-oxide matrix. During an activation that uses an acid treatment, hydrogen ions from the acid solution diffuse into the LMO structure, replacing lithium ions. This ion exchange process is facilitated by the porosity and reactive surface created through earlier steps of calcination and milling. In some embodiments, the use of a multi-proton acid, like $H_2SO_4$, may be desirable.

The result of this acid activation is the formation of a hydrogen-manganese-oxide (HMO) sorbent spinel. HMOs are known for their unique properties, such as high surface area and catalytic activity, making them suitable for various applications, including sorption and catalysis. The successful conversion of LMO to HMO via acid activation underscores the importance of carefully controlled process conditions to achieve the desired material transformation and properties.

In some embodiments, the intermediate-state sorbent blend may include less than 0.1% by weight $Mn_3O_4$, less than 1% by weight $Mn_2O_3$, and at least 95% by weight LMO. In some embodiments, the LMO has a lithium loading capacity of at least 18.0 mg/g of activated LMO.

In some embodiments, the sorbent blend may include less than 1% by weight $Mn_2O_3$ and at least 98% by weight LMO. In some embodiments, the activated sorbent blend may include at least one species of HMO sorbent spinel having a lithium loading capacity of at least 23.0 mg/g of activated LMO.

BRIEF DESCRIPTION OF THE FIGURES

FIG. 6 is a table illustrating the respective quantities of intermediate-state sorbent blend obtained at different calcining temperatures during the first calcining duration as described in the method for manufacturing an LMO sorbent spinel from FIG. 2, according to some embodiments of the present disclosure.

FIG. 7 is a table illustrating the respective compound compositions of intermediate-state sorbent blend obtained at a calcining temperature of 525° C. at different time intervals during the first calcining duration as described in the method for manufacturing an LMO sorbent spinel from FIG. 2, according to some embodiments of the present disclosure.

FIG. 8 is a table illustrating the respective quantities of intermediate-state sorbent blend as described in the method for manufacturing an LMO sorbent spinel from FIG. 2, according to some embodiments of the present disclosure. The initial reacting was performed at different first durations at a few select first temperatures. The table also includes the compound compositions of the LMO sorbent spinel after the second calcination where calcining temperatures of 525° C. were performed at various second durations.

FIG. 9 is a table illustrating the respective quantities of sorbent blend obtained at a first calcining temperature of 525° C. at different time intervals, while the duration of the second calcining is held constant for approximately ten (10) hours as described in the method for manufacturing a LMO sorbent spinel from FIG. 5, according to some embodiments of the present disclosure.

FIG. 10 is a table illustrating the loading capacity of LMO sorbent spinel obtained at different calcining temperatures for different durations during the first and second calcining duration when activated as described in the method for manufacturing an LMO sorbent spinel from FIG. 5, according to some embodiments of the present disclosure.

FIG. 11 is a table illustrating the compound composition percentages of intermediate sorbents, loading capacities and iron percentages of undoped sorbent spinel after initial and second calcination temperatures and durations, when activated as described in the method for manufacturing an LMO sorbent spinel from FIG. 5, according to some embodiments of the present disclosure.

DETAILED DESCRIPTION

Figure 1:
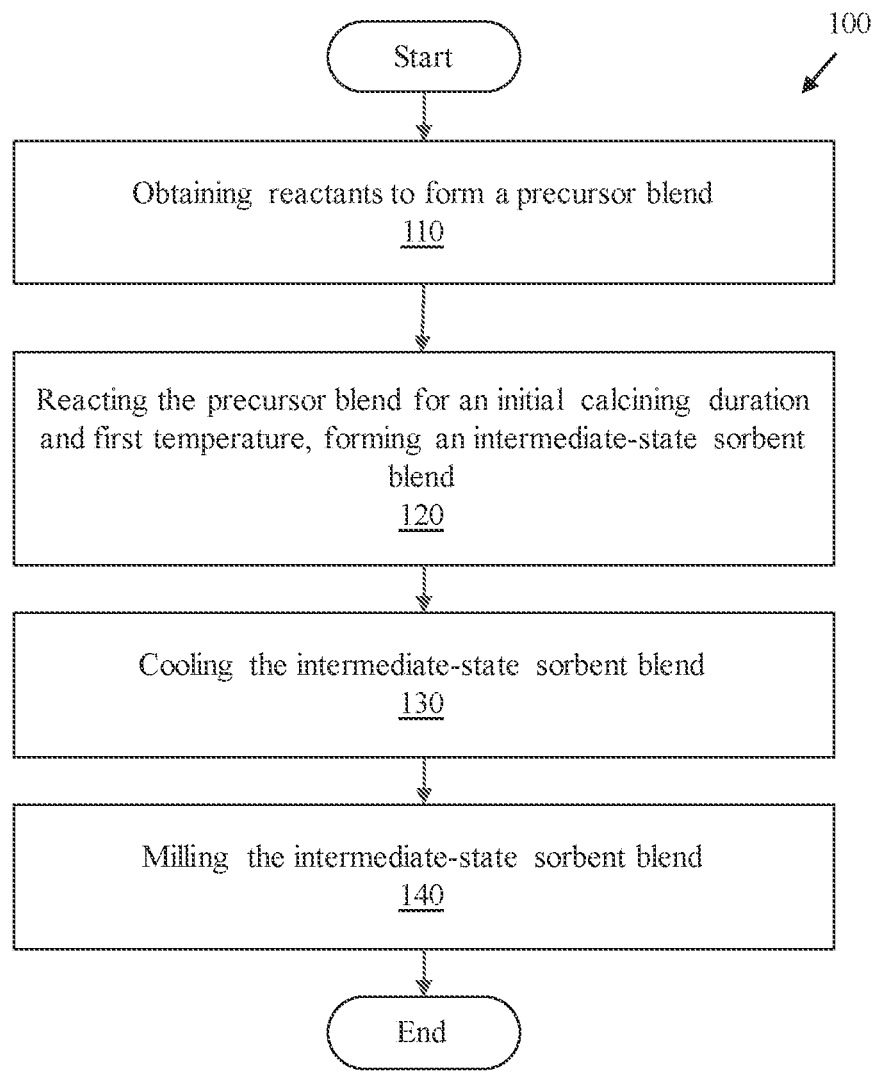
FIG. 1 is a flowchart illustrating a method, according to some embodiments of the present disclosure.

Direct Lithium Extraction (DLE) often uses an activated Lithium Manganese Oxide (LMO) sorbent to remove lithium from produced water. While much research has been done exploring the use of LMOs to adsorb lithium at lab scale, improvements in manufacturing LMOs at the scale required to process tens of thousands of gallons of water per hour are needed. An example of a DLE system that may be used to continuously or batch process a produced water at scale is described in U.S. provisional application No. 63/489,645, titled SYSTEM AND METHOD FOR REDUCING A CONCENTRATION OF A METAL FROM PRODUCED WATER USING A LARGE FORMAT COMPOSITION, filed on Mar. 10, 2023, the contents of which are incorporated in their entirety by reference to the extent not inconsistent herewith. A critical factor in scaling up DLE systems to meet commercial demand is producing LMOs in bulk with the reactants that are presently available.

Conventional techniques for producing lab-scale quantities of LMO are described in Paulsen, J. M.; Dahn, J. R.; "Phase Diagram of Li—Mn—O Spinel in Air"; published by the American Chemical Society on Oct. 27, 1999 https://cdn.bc-pf.org/olympiads/chemistry/rus_sbory/2010-Oct/thermo.pdf, the contents of which are incorporated by reference herein in their entirety to the extent not inconsistent herewith. Further, optimizing (or at least improving relative to other synthesis techniques) synthesis techniques of a spinel sorbent, reacting durations, and temperatures may be altered to enhance the purity and/or loading capacity of lithium manganese oxide (LMO) for various applications, including lithium-ion batteries, catalysis, and sorbents. For illustrative purposes, the initial calcining duration generally refers to the time under temperature and does not necessarily account for the ramp-up period to achieve temperature or the ramp-down period to achieve a cool-down temperature.

Spinel sorbents, such as LMOs, are an important group of compounds in direct lithium extraction (DLE) systems. Some techniques for manufacturing these spinel sorbents are often described with respect to laboratory scale. When synthesizing larger volumes of sorbent spinels, such as a 15 to 20 kg batch size of LMO sorbent for treating 500 gallons of 30 PPM lithium produced water, it may be necessary to use a lower grade of the precursor blend. Lower-grade reactants may greatly impact the loading capacity of the sorbent, often reducing the loading capacity of the sorbent and impacting the fragility of the spinel structure and lattice integrities. Commercially available $Mn_3O_4$ may include several compounds that impact the formation of an LMO, which contributes to the ultimate loading capacity of the activated LMO and the quantity of LMO produced. Undesired compounds, such as iron (e.g., $Fe_2O_3$), vary in the amount present from a lower grade commercially available $Mn_3O_4$ source (e.g., percent by weight of iron more than 1.0) while higher grade $Mn_3O_4$ sources will have a lower volume of iron (e.g., percent by weight of less than 0.7). Similarly, the availability of Mn may vary by grade, such that higher grades of $Mn_3O_4$ may be available in % Mn by weight more than or equal to 71% of overall weight. The percentage of Mn and quality often must be factored in, as in some DLE systems, it may be necessary to use between 12 kg and 20 kg of LMO or more with at least a 13 mg/g loading capacity to process 500 gallons of produced water containing a concentration of 30 mg/L of lithium to economically perform DLE at industrial scale in a commercial DLE operation.

Conventional batch-processing techniques benefit from higher-purity reactants that can be sourced in sufficient quantities and purities to synthesize a spinel sorbent at the lab scale. As batch sizes increase to accommodate industrial-scale direct metal extraction systems, and costs of reactants and reaction time and the associated costs of reacting the reactants increase, techniques typically must be developed for synthesizing spinel sorbents that reflect the realities of today's supply chains, variation in reactant grade from lot to lot, and limited availability of ideal reactants of relatively higher-grade reactants. For example, while Mn sources in $Mn_2O_3$ and/or $Mn_3O_4$ are desired in some embodiments, alternative sources of Mn, such as a manganese carbonate, might need to be used to synthesize the spinel sorbent due to lack of availability of the preferred grade of the Mn source. In such instances, biasing the compound composition of an intermediate sorbent to create desired compounds may be desirable before converting the intermediate state to a sorbent blend.

The present disclosure includes techniques for using commercially available reactants within a range of temperatures to manufacture a high-loading-capacity LMO at scale. Such techniques may include transitioning a commercially available precursor to an intermediate state or an intermediate-state sorbent blend at a higher range of temperatures before converting the intermediate state to a sorbent blend. In some embodiments, the intermediates, $Mn_3O_4$ and $Mn_2O_3$ particles, were synthesized by calcination for a specific duration, and the desired LMO spinel is obtained through an economical route. Transitioning a commercially available precursor to an intermediate state or an intermediate state sorbent blend may be biased to produce a higher LMO product or a higher-intermediate-state compound-rich sorbent blend. Biasing the formation of specific constituents of the ultimate sorbent blend may be accomplished by varying the reactants within the precursor blend, varying the reaction modality (e.g., using different spinel sorbent synthesis techniques such as by calcining), varying the reaction duration, varying the reaction conditions (such as the temperature or temperatures of the reaction), and increasing the number of reactions. In some embodiments, a reaction period is used to calculate the number of reactions. For example, a reaction period may begin with an initial reaction time, followed by a cooling duration and milling. A second reaction period may signify a second reaction period has been initiated.

In some embodiments, an intermediate state is beneficial when a reactant, such as an economical form of manganese oxide like $Mn_3O_4$, is converted to an intermediate-state reactant, like $Mn_2O_3$ before a large amount of LMO may be synthesized. Some experimental results in which the reaction time was varied suggest that when calcining is stopped at defined intervals while the calcination temperature is held constant, the intermediate-state $Mn_2O_3$ increases in quantity until the initial-reactant $Mn_3O_4$ is no longer detectable using XRD. The evidence suggests that for a large amount of LMO to be synthesized from a relatively high-grade Mn source, an intermediate state compound may be a necessary precursor reactant for reaction with a lithium reactant, such as LiOH monohydrate, before a LMO may be formed. By adopting the techniques described in the present disclosure, manufacturers may be incentivized to bias reactions involved in synthesizing sorbent spinels to first produce intermediate reactants, such as $Mn_2O_3$. By altering reaction conditions, like temperature, pressure, and reaction duration, to first convert at least one reactant within a precursor blend to form an intermediate state compound, the reaction conditions can be optimized to produce sorbent spinels at volumes necessary for industrial scale.

In some embodiments, a commercially available manganese oxide reactant may be included as one constituent of a precursor blend. As some manganese oxides may be converted to a necessary precursor reactant at temperatures described in the present disclosure, it can be advantageous to react a commercially available manganese oxide with a lithium donor to form a precursor blend. Turning now to FIG. 1, a flowchart 100 describes a method, according to some embodiments of the present disclosure. In some embodiments, at 110, the method may include obtaining reactants, such as $Mn_2O_3$ and LiOH monohydrate, to form a precursor blend. When seeking to produce an LMO spinel at scale, a precursor blend may include at least one reagent that typically must be chemically changed before an LMO spinel may be formed. Such a chemical transformation may occur by reacting the precursor blend. In some embodiments, the reacting the precursor blend may include reacting the precursor blend at a high temperature and pressure to produce the intermediate-state sorbent. In some instances, reacting may include firing, a solid-state reaction such as calcination or calcining, microwave-assisted synthesis, mechanochemical synthesis, and combustion synthesis.

At 120, the method may include reacting, or calcining, the precursor blend for an initial calcining duration and at a first temperature, forming an intermediate-state sorbent blend. In some embodiments, the initial calcining duration is the time spent holding the defined temperature and does not necessarily account for the ramp-up period to achieve temperature, or the cool-down period after the defined duration is complete. An intermediate-state sorbent blend may be a desirable intermediate-state between a pure precursor blend of reactants and an end state of substantially pure sorbent blend. For example, when the precursor blend is a mix of lithium and manganese-oxide blend, wherein the manganese-oxide blend is an initial chemical formula, the intermediate-state sorbent may include a reduced volume of at least one reactant, a reactant at a second state, and some LMO. For illustrative purposes, a precursor blend may include a 3:4 ratio of lithium to manganese blend, the manganese reactant being $Mn_3O_4$ as the first state. Upon calcining the 3:4 ratio of lithium to manganese blend for an initial duration of five (5) hours at 525° C., an intermediate-state sorbent blend may include at least 89% by weight LMO and at least 4.5% by weight $Mn_2O_3$ (a second state reactant of the $Mn_3O_4$ first reactant state). Testing the volumes of the chemical constituents of the intermediate-state sorbent blend may be accomplished using X-ray Diffractometer (XRD) equipment, such as the Rigaku Benchtop X-ray Diffractometer MiniFlex600.

At 130, the method may include cooling the intermediate-state sorbent blend. Cooling may be beneficial in some commercial settings to safely handle the intermediate-state sorbent blend. At 140, the method may include milling the intermediate-state sorbent blend. In some embodiments, the reacting, such as when calcining techniques are used, results in the agglomeration of the intermediate-state sorbent blend. In such instances, it may be beneficial to cool the intermediate-state sorbent blend and mill the blend to a size that is readily retained within a batch- or continuous-processing DLE system. For example, the intermediate-state sorbent may be milled such that the size of the intermediate-state sorbent exceeds the pore size of membrane-based DLE systems such that the intermediate-state sorbent may be retained within the DLE system.

In some embodiments, the reactants may include at least one manganese compound. For example, the reactants may include at least one of $MnO_2$. $Mn_3O_4$, $Mn(NO_3)_2$, $MnCO_3$, or $Mn_2O_3$. In some embodiments, the reactants may include at least one lithium hydroxide, lithium carbonate, or at least one of $Mn_3O_4$, $MnCO_3$, or $Mn_2O_3$. The manganese compound may have a chemical formula of $Mn_3O_4$. In some embodiments, the intermediate-state sorbent blend further comprises at least 4.5% by weight $Mn_3O_4$ and less than 40% by weight $Mn_2O_3$ after a first calcination. In some embodiments, the reactants may include $Mn_2O_3$ and LiOH. In some embodiments, the initial calcining duration may be at least five (5) hours, and the first temperature may be at least 525° C.

In some embodiments, the initial calcining duration may be at least five (5) hours, and the first temperature may be at least 500° C. In some embodiments, the intermediate-state sorbent blend further comprises approximately 1% by weight $Mn_3O_4$, 9% by weight $Mn_2O_3$, and 90.0% by weight an LMO. Approximately generally refers to measurements that are within the tolerance of the measuring equipment, or the measurement is within a +/−5% of the stated value, whichever is greater. In some embodiments, the initial calcining duration may be at least five (5) hours, and the first temperature is approximately 600° C. In some embodiments, the intermediate-state sorbent blend further comprises less than 3.5% by weight $Mn_3O_4$, less than 26.0% by weight $Mn_2O_3$, less than 3.0% by weight of LiOH monohydrate, and at least 68% by weight an LMO when higher-grade reactants are used in the precursor blend. In some embodiments, the initial calcining duration may be approximately five (5) hours, and the first temperature may be at least 525° C. In some embodiments, the intermediate-state sorbent blend further comprises greater than 4.0% by weight $Mn_2O_3$, and greater than 90°/% by weight an LMO. The LMO may have a lithium loading capacity of at least 13.0 mg/g of LMO.

Figure 2:
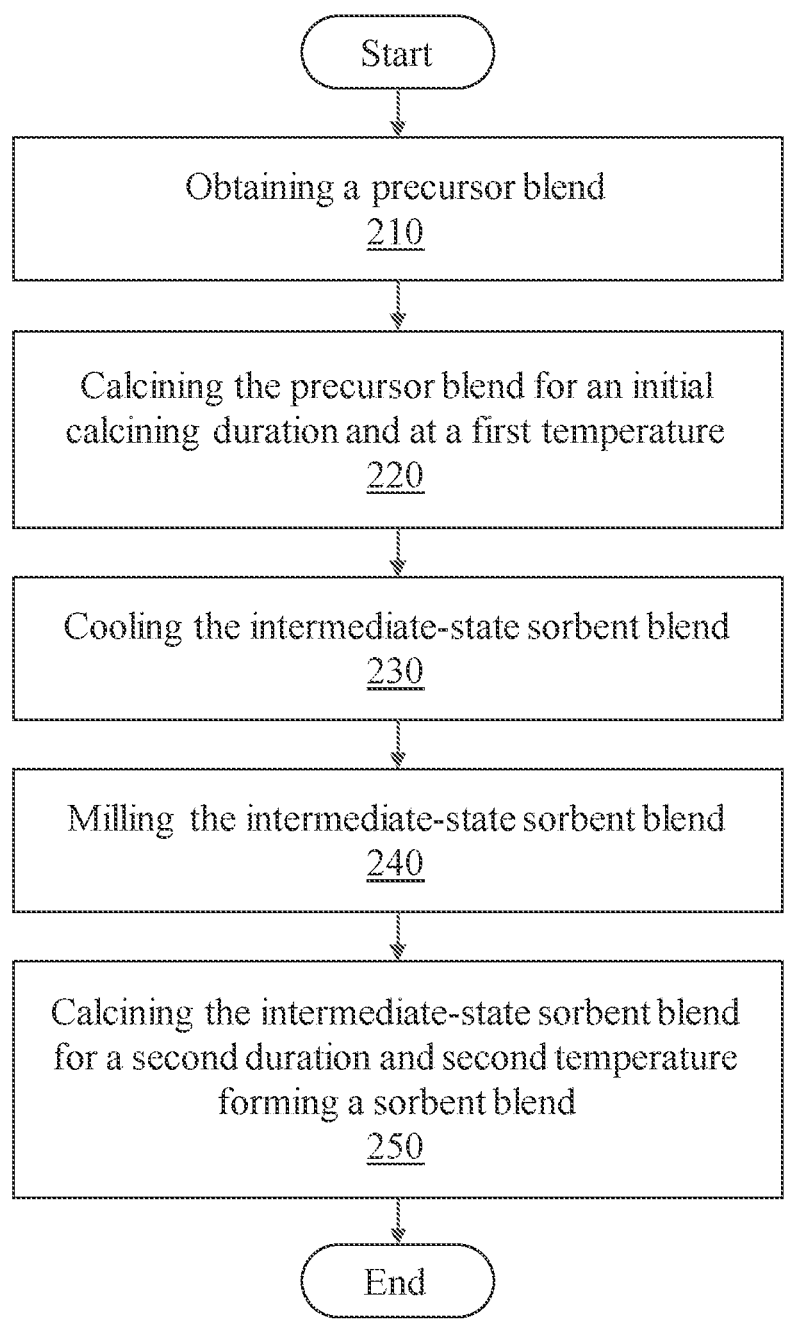
FIG. 2 is a flowchart illustrating a method for manufacturing a LMO sorbent spinel, according to some embodiments of the present disclosure.

FIG. 2 is a flowchart that describes a method for manufacturing an LMO sorbent spinel, according to some embodiments of the present disclosure. In some embodiments, at 210, the method may include obtaining a precursor blend. A precursor blend may include reactants that are necessary for producing one or more reactions that have taken place. While the present disclosure describes the formation of lithium-manganese-oxides (LMOs), the present techniques also apply to other metal-oxide sorbents, such as lithium-ion sieve (LIS) and uncoated sorbents like titanate sorbents. In some embodiments, the precursor blend may be one of a 3:4, a 4:5, or a 0.70 to 0.85 molar ratio of lithium to manganese blend.

At step 220, the method may include calcining as a means for reacting the precursor blend. In some embodiments, the step may include calcining the precursor blend for an initial calcining duration and at a first temperature of, e.g., at least 500° C. Calcining durations may be altered to bias the production of specific constituents within specific quantity ranges. In one embodiment, the calcining duration may be biased to produce an LMO of at least 85% phase composition as measured with XRD data, at least 7% intermediate-state product (e.g., $Mn_2O_3$), and ideally, an undetectable amount of reactant from the precursor blend. To synthesize the intermediate-state sorbent blend with the biased intermediate sorbent constituents, a calcining temperature of at least 500° C. and a minimum reaction duration of approximately five (5) hours is performed.

In some embodiments, at 230, the method may include cooling the intermediate-state sorbent blend. Cooling the sorbent may be useful when handling the intermediate sorbent blend at the reaction temperature is impractical or does not comply with manufacturing-safety protocols. Cooling the intermediate-state sorbent blend at 240 may include additional steps. In some embodiments, for example, the synthesis of an LMO may involve performing additional steps like milling an agglomerated intermediate-state sorbent blend. When additional refinement to the precursor blend is not desired, milling may be performed to support the measuring of the sorbent-blend for packaging and sale or for activation prior to use in a DLE system. In some embodiments, the milling step, as described in FIG. 2 during LMO synthesis, can help remove impurities and enhance the material's purity, which in turn improves loading capacity. Additionally, optimization (or at least improvement relative to other synthesis techniques) of synthesis parameters such as temperature, calcination duration, or precursor ratios can influence the crystal structure and morphology of LMO spinel obtained, thereby affecting loading capacity.

In some embodiments, it may be desirable to further purify or otherwise increase the percent phase composition of a desired product, such as the LMO. When a precursor blend of relatively high quality is used in the first reaction, a second reaction event can be performed to reduce an intermediate-state product, like $Mn_2O_3$, and bias the reaction to produce a higher percentage of LMO. At 250, the method may include calcining the intermediate-state sorbent blend for a second duration and the second temperature, thus forming a sorbent blend. The calcining may form an intermediate-state sorbent blend of at least $Mn_2O_3$ and an LMO.

The lithium loading capacity of the LMO may vary based on the temperature used during the first and second reactions. When calcining is performed, generally lower calcining temperatures of approximately 425° C. tend to produce LMOs with a lower loading capacity. In some embodiments, air may be pumped into a kiln during the calcination. When the air is not pre-heated to the kiln temperature, the added air may result in a lower-loading-capacity LMO.

Turning now to Table 1, multiple two-step reactions were conducted consistent with the process of FIG. 2. A precursor blend of LiOH·H$_2$O and Mn$_3$O$_4$ were mixed in a 3:4 ratio of Li:Mn. In each reaction (i.e., React. 1 and React. 2), the reaction duration was held constant at five (5) hours, while the temperatures of each reaction were held at approximately 425° C.; and 525° C. In some instances, unheated air was pumped into the kiln. The intermediate-state sorbent blend was analyzed using XRD, with the results and loading capacity of the isolated LMO provided below.

TABLE 1

First and Second Calcination results with and without air using a higher-grade precursor blend.

| No. | Air | React. 1 | React. 2 | React 2 Duration | Loading (mg/g) | Mn$_2$O$_3$ | LMO |
|---|---|---|---|---|---|---|---|
| 1 | Y | 425 | 500 | 5 | 6.8 | 38.6 | 61.4 |
| 2 | N | 525 | 525 | 10 | 17.8 | 0.3 | 99.7 |
| 3 | Y | 525 | 525 | 10 | 14.8 | 2.3 | 97.7 |
| 4 | Y | 525 | 525 | 10 | 13.9 | 2.3 | 97.7 |

As seen in Table 1, varying the reaction parameters of temperature and duration can bias the constituents present and the percentage of the constituents within the synthesized-sorbent blend. When the grade of the reactants forming the precursor blend is higher, the constituents of the sorbent blend are more reliably predicted. Overall, higher-quality reactants tend to comprise approximately 70% composition by weight of manganese. Lower-quality reactant sources often include compounds containing P, Fe, and CaO in percent by mass as high as 0.71%, 2.70%, and 0.46%, respectively. Consistently higher percentages of desired intermediate-state compounds, like LMO and Mn$_2$O$_3$, are produced when compounds like Fe are reduced to approximately 0.20% or even eliminated. One such technique for reducing or removing iron content is magnetic separation. In some embodiments, the initial calcining duration may be set to at least five (5) hours. In some embodiments, the initial calcining duration may be at least five (5) hours and the first temperature may be at least 500° C. In some embodiments, the intermediate-state sorbent blend further comprises approximately 1% by weight Mn$_3$O$_4$, 9% by weight Mn$_2$O$_3$, and 90% by weight an LMO. In some embodiments, the initial calcining duration may be at least five (5) hours and the first temperature may be at least 600° C. In some embodiments, the intermediate-state sorbent blend further comprises approximately 2.01% by weight Mn$_3$O$_4$ 24% by weight Mn$_2$O$_3$, 2.0% by weight of LiOH monohydrate, and at least 72% by weight an LMO. In some embodiments, the initial calcining duration may be at least five (5) hours and the first temperature may be at least 525° C. In some embodiments, the intermediate-state sorbent blend further comprises approximately 5.0% by weight Mn$_2$O$_3$, and 94% by weight an LMO. The LMO may have a lithium loading capacity of at least 14.6 mg/g of LMO.

Additionally, Table 1 characterizes the impact of temperature, airflow, and reaction duration for biasing the synthesis of LMO and Mn$_2$O$_3$ of desired percentages of purity. To obtain an LMO of at least 60% by weight with a loading capacity of at least 6 mg/g using higher-grade reactants, the precursor blend should be calcined for an initial calcining temperature of at least 425° C. and a second calcining temperature of 500° C. for a duration of at least five (5) hours in the presence of air. To obtain an LMO of approximately 99% purity with a loading capacity of at least 17 mg/g, the precursor blend should be calcined for an initial calcining temperature of 525° C. and duration of five (5) hours, followed by a second calcining temperature of 525° C. and a duration of at least ten (10) hours, without forced air pumped into the kiln.

In order to bias the synthesis of an LMO to approximately 97% purity with a loading capacity of at least 14 mg/g within the intermediate-state sorbent, the precursor blend should be calcined for an initial calcining temperature of approximately 525° C. and duration of at least five (5) hours, followed by a second calcining temperature of at least 525° C. for a duration of at least ten (10) hours in the presence of forced unheated air. In some embodiments, forced air may be preheated to the temperature of a heating apparatus, for example a kiln. Preheating forced air, for example, to the desired temperature of the kiln for biasing purposes, offers additional control over the effective temperature of the calcination temperature and marginally greater mass of LMO and improved loading capacity.

Figure 3:
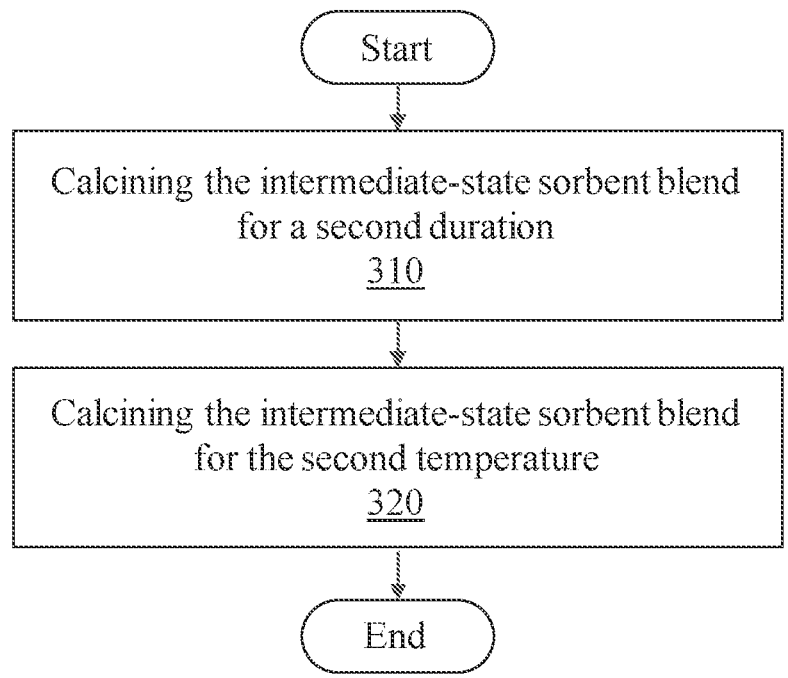
FIG. 3 is a flowchart further illustrating the method for manufacturing a LMO sorbent spinel from FIG. 2, according to some embodiments of the present disclosure.

FIG. 3 is a flowchart that further describes the method for manufacturing an LMO sorbent spinel based on principles described in relation to FIG. 2, according to some embodiments of the present disclosure. In some embodiments, the calcining of the intermediate-state sorbent blend for a second duration and a second temperature may include steps 310 to 320. In some embodiments, the calcination duration of step 250 (FIG. 2) may be set to a period of between three (3) hours, as in 310, to as many as ten (10) hours. To demonstrate the variability of the process to bias the formation of specific compound constituents and their quantities within the sorbent blend, step 250 may be modified by selecting a temperature that is the same or different from the initial reaction temperature used in the first calcination. In some embodiments, a second calcination temperature of at least 500° C. but less than 550° C. may be desired. The sorbent may calcinate further, increasing the weight of LMO in the sorbent blend compared with the weight of LMO present in the intermediate sorbent blend. In some embodiments, the second calcination event may result in an LMO having an increased lithium loading capacity when activated.

Figure 4:
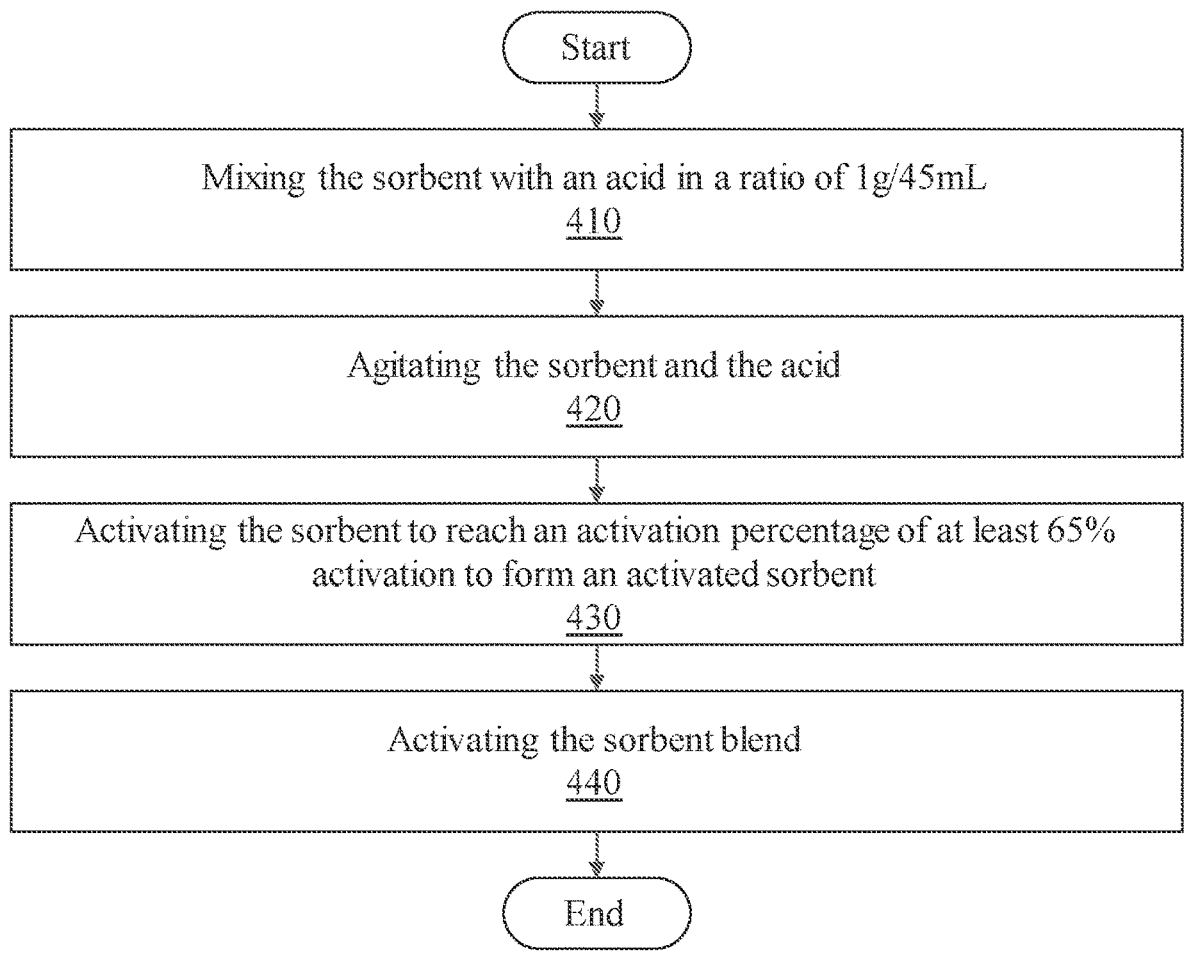
FIG. 4 is a flowchart further illustrating the method for manufacturing a LMO sorbent spinel from FIG. 2, according to some embodiments of the present disclosure.

FIG. 4 is a flowchart that further describes the method for manufacturing an LMO sorbent spinel from FIG. 2, according to some embodiments of the present disclosure. In some embodiments, at 440, the method may include activating the sorbent blend. Activating the LMO often involves preparing an LMO, by displacing the lithium within the LMO structure with an alternative ionic element, such as hydrogen. In general, an activated LMO may be an HMO. In some embodiments, at 410, the activating may include mixing the spinel sorbent with an acid. In some embodiments, the acid may be a single proton donor, such as HCl, or maybe a multiphoton donor, such as H$_2$SO$_4$. In some embodiments, the spinel sorbent, such as an LMO, may be activated using a ratio of lg of LMO per 45 mL of an acid. At 420, the activating may include agitating the sorbent. Agitating the sorbent may accelerate the activation step, and the mechanism for agitating the mix may be selected to reduce the damage done to the spinel structure. The spinel sorbent and the acid may be placed in contact for between sixteen to forty-eight (16 to 48) hours, although shorter durations may be possible. In some embodiments, spinel sorbent and the acid may be agitated during the contact time, allowing the contact time to be reduced to less than 16 hours. Since rough handling of the sorbent may degrade the spinel structure of the LMO, careful management of the process coupled with active monitoring of the turbidity may be factored in to optimize (or at least to improve relative to other formation techniques) the contact time duration while minimizing (or at least to improve relative to other formation techniques) spinel-structure degradation. In some embodiments, the mixture of acid and spinel sorbent may be allowed to reach equilibrium without an agitation mechanism. The duration may be altered to achieve a certain amount of activation for the given reagent used. Factors that influence the duration in which the desired activation of the spinel structure is achieved vary based on the nature of the spinel sorbent (e.g., a titanate, an LMO, an aluminate sorbent), the reagent used to activate the spinel sorbent (e.g., when an acid is used, the molality of the acid, the strength of the acid), the volume of a fluid the spinel structure is immersed within, the chemical constituents of the fluid containing the spinel structure, and other variables like pressure, temperature, and mixing or agitation mechanisms used. For example, in some embodiments, at 430, the activation may include activating the sorbent for a duration necessary to reach an activation percentage of at least 65% activation to form an activated sorbent at standard temperature and pressure (STP).

Figure 5:
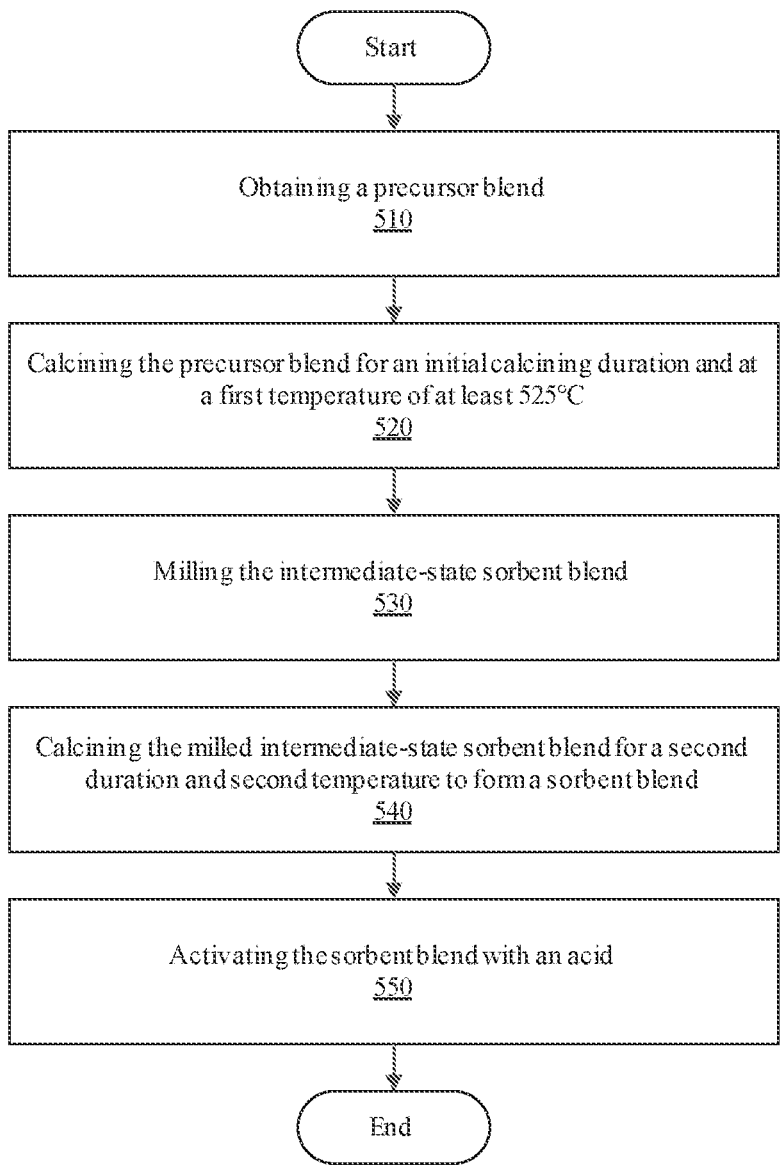
FIG. 5 is a flowchart illustrating a method for manufacturing an activated LMO sorbent spinel, according to some embodiments of the present disclosure.

FIG. 5 is a flowchart that describes a method for manufacturing an undoped activated LMO sorbent spinel, according to some embodiments of the present disclosure. In some embodiments, at 510, the method may include obtaining a precursor blend. When working with a sorbent spinel at an industrial scale, reactants critical to manufacturing the sorbent spinel are often accompanied by impurities introduced into the precursor blend. Purity, in the context of the sorbent blend comprising lithium manganese oxide (LMO), is a parameter that denotes the percentage of the desired reactants, along with other constituents. This concept of purity is particularly important when aiming for a specific biased yield of LMO to be synthesized within a specific reaction duration and, in certain embodiments, at predetermined temperatures. Achieving the desired level of purity in the sorbent blend ensures that the subsequent reactions and processes yield LMO with the intended structural and chemical properties, optimizing (or at least improving relative to other formation techniques) the LMO's performance as a sorbent.

At 520, the method may include calcining the precursor blend for an initial calcining duration and at a first temperature of at least 525° C. At 530, the method may include milling the intermediate-state sorbent blend. At 540, the method may include calcining the milled intermediate-state sorbent blend for a second duration and at a second temperature, the result being forming a sorbent blend. At 550, the method may include activating the sorbent blend with an acid.

In some embodiments, the purity and loading capacity of lithium manganese oxide (LMO) can be influenced by various factors, including the synthesis techniques, durations, and temperatures employed during its preparation. Different synthesis techniques known in the art, such as solid-state synthesis, sol-gel method, co-precipitation, hydrothermal synthesis, and combustion synthesis, can impact the purity and properties of LMO. For example, sol-gel methods typically involve the hydrolysis and condensation of precursor solutions to form a gel, followed by drying and calcination. Co-precipitation techniques involve the simultaneous precipitation of metal ions from solution, which can result in homogeneous mixing and fine particle size distribution, potentially increasing the loading capacity of LMO.

In some embodiments of the present disclosure, the duration of the reaction, including time at temperature and variations in temperature, may affect the purity and potentially the spinel structure of the LMO. In some commercial applications, it may be advantageous to produce a higher purity of LMO in relation to the initial reactants in a shorter duration using more readily available Manganese compound sources, such as $Mn_3O_4$. Referring to FIG. 6, a table of reaction temperatures used during a constant reaction duration of five (5) hours is provided. Within the table, a precursor blend mass of twenty-five (25) grams composed of the reactants $LiOH \cdot H_2O$ and $Mn_3O_4$ mixed in a 3:4 molar ratio of lithium to manganese blend is utilized.

FIG. 6 is a table that describes the quantities of intermediate-state sorbent blend obtained at different calcining temperatures during the first calcining duration as described in the method for manufacturing an LMO sorbent spinel from FIG. 2, according to some embodiments of the present disclosure. The values within FIG. 6 represent the weight percent phase composition of each compound as determined by Rietveld refinement of XRD data. At 400° C., for a calcining duration of five (5) hours, 11.51% of LMO, 6.98% of $Mn_2O_3$, 77.41% of $Mn_3O_4$ and 4.11% of LiOH monohydrate are obtained. At 450° C., for a calcining duration of five (5) hours, 7.08% of LMO, 12.81% of $Mn_2O_3$, 78.07% of $Mn_3O_4$, and 2.04% of LiOH monohydrate are obtained. At 500° C., for a calcining duration of five (5) hours, 90.62 g of LMO, 9.04 g of $Mn_2O_3$, and 0.34% of $Mn_3O_4$ are obtained (little or no (0%) $LiOH \cdot H_2O$ is obtained). At 525° C., for a calcining duration of five (5) hours, 94.42% of LMO and 5.58% $Mn_2O_3$ are obtained (little or no (0%) $Mn_3O_4$ and little or no (0%) $LiOH \cdot H_2O$ are obtained). At 550° C., for a calcining duration of five (5) hours, 82.6 g of LMO and 17.40 g of $Mn_2O_3$ are obtained (little or no (0%) $Mn_3O_4$ and little or no (0%) $LiOH \cdot H_2O$ are obtained). At 600° C., for a calcining duration of five (5) hours, 72.2% by weight of LMO, 23.98% by weight of $Mn_2O_3$, 2.21% of $Mn_3O_4$, and 1.62% of UGH monohydrate ($LiOH \cdot H_2O$) are obtained. At 650° C., for a calcining duration of five (5) hours, 74.34% by weight of LMO and 25.66% by weight of $Mn_2O_3$ are obtained (little or no (0%) $Mn_3O_4$ and little or no (0%) $LiOH \cdot H_2O$ are obtained).

A reaction, with regard to FIG. 6, such as calcination of a fixed five-hour duration on the precursor blend, may be performed at various temperatures, for example, a temperature between 400° C. and 650° C. At the end of each five-hour period, the calcining results in the formation of an intermediate-state sorbent blend of at least $Mn_2O_3$ and an LMO. The table suggests that as the calcination temperature increases, the reactants present in the precursor blend found within the intermediate-state sorbent decrease from their initial mass weights. In some embodiments, the presence of lithium hydroxide monohydrate (LiOH·H2O) facilitates the conversion of manganese (II, III) oxide ($Mn_3O_4$) to manganese (III) oxide ($Mn_2O_3$) and a lithium manganese oxide (LMO) through a reaction. Manganese (III) oxide ($Mn_2O_3$) may be produced as a byproduct of the reaction between lithium oxide and manganese (II, III) oxide. $Mn_2O_3$ may form as a separate phase or coexist with LMO depending on the synthesis conditions.

Optimization (or at least improvement relative to other formation techniques) of the formation of an LMO and reduction of the reactants within a limited time frame may be optimized (or at least improved relative to other formation techniques) within a window of calcination temperatures of approximately 500° C. and 525° C. The data suggests that when 100 grams of reactants are mixed in a 3.4 ratio, and at least 90 grams of LMO are desired, the formation of LMO may be optimized (or at least improved relative to other formation techniques) by calcining at approximately 500° C. and 525° C. In some embodiments, it may be desired to produce an intermediate-state sorbent blend with negligible or unmeasurable amounts of reactants. When the purity of the LMO requires at least 80 grams of LMO and negligible or unmeasurable amounts of reactants, a five-hour calcination period from approximately 525° C. to approximately 550° C. may be preferred. In some embodiments, lithium manganese oxide (e.g., a compound best match of $Li_{1.33}Mn_{1.67}O_4$ as determined using XRD, $LiMn_2O_4$, or LMO) is the desired product of the reaction. LMO forms as a spinel phase by incorporating lithium ions into the manganese-oxide lattice.

FIG. 7 is a table illustrating the respective quantities of intermediate-state sorbent blend obtained at a calcining temperature of 525° C. at different time intervals during the first calcining duration as described in the method for manufacturing an LMO sorbent spinel from FIG. 2, according to some embodiments of the present disclosure. At 525° C., for 0.5 hours, 55.5% by weight of LMO, 7.04% by weight of $Mn_2O_3$, 37.19% of $Mn_3O_4$, and 0.26% of LiOH monohydrate ($LiOH \cdot H_2O$) are obtained. At 525° C., for 1 hour, 69.02% by weight of LMO, 15.69% by weight of $Mn_2O_3$, 11.0% of $Mn_3O_4$, and 4.3% of LiOH monohydrate are obtained. At 525° C., for 1.5 hours, 84.36% by weight of LMO and 15.64% by weight of $Mn_2O_3$ are obtained (little or no (0%) $Mn_3O_4$ and little or no (0%) $LiOH \cdot H_2O$ are obtained). At 525° C., for five (5) hours, 94.42% by weight of LMO and 5.58% by weight of $Mn_2O_3$ are obtained (little or no (0%) $Mn_3O_4$ and little or no (0%) $LiOH \cdot H_2O$ are obtained). At 525° C., for eight (8) hours, 78.79% by weight of LMO, 20.66% by weight of $Mn_2O_3$, 0.08% of $Mn_2O_4$, and 0.47% of LiOH monohydrate ($LiOH \cdot H_2O$) are obtained. At 525° C., for fifteen (15) hours, 83.54% by weight of LMO and 16.46% by weight of $Mn_2O_3$ are obtained (little or no (0%) $Mn_3O_4$ and little or no (0%) $LiOH \cdot H_2O$ are obtained). The calcination duration for $Mn_2O_3$ is about five (5) hours at 525° C. to ensure conversion to 95% of LMO (e.g., a compound best match of $Li_{1.33}Mn_{1.67}O_4$ as determined using XRD, $LiMn_2O_4$) through dehydration while minimizing impurities and phase transformations. An extended calcination duration beyond five (5) hours results in the compound composition of LMO into secondary phases or the conversion of LMO to $Mn_3O_4$, inducing the formation of either any one of the phase impurities or particle growth/agglomeration or morphological changes or loss of lithium and manganese.

FIG. 8 is a table illustrating the compound composition percentages of the intermediate sorbents of calcined undoped precursor blend during second calcination temperatures and durations, as described in the method for manufacturing a doped LMO sorbent spinel from FIG. 5, according to some embodiments of the present disclosure. At 400° C., for an initial calcining duration of 5 hours and a second calcining duration of 10 hours at 525° C., the compound composition percentages of undoped intermediate-state sorbents are 76.59% by weight of LMO and 23.41% by weight of $Mn_2O_3$. At 525° C., for an initial calcining duration of 0.5 hours and a second calcining duration of 0.5 hours at the same temperature, the compound composition percentages of undoped intermediate-state sorbents obtained are 63.32% by weight of LMO, 25.68% by weight of $Mn_2O_3$, 10.37% by weight of $Mn_3O_4$, and 0.64% by weight of LiOH monohydrate. At 525° C., for an initial calcining duration of 0.5 hours and a second calcining duration of 10 hours at the same temperature, the compound composition percentages of undoped intermediate-state sorbents obtained are 83.24% by weight of LMO, 16.67% by weight of $Mn_2O_3$, 0.06% by weight of $Mn_3O_4$, and 0.02% by weight of LiOH monohydrate obtained. At 525° C., for an initial calcining duration of 2 hours and a second calcining duration of 2 hours at the same temperature, the compound composition percentages of undoped intermediate-state sorbents obtained are 79.89% by weight of LMO, 19.42% by weight of $Mn_2O_3$, 0.49% by weight of $Mn_3O_4$, and 0.21% by weight of LiOH monohydrate. At 525° C., for an initial calcining duration of 2 hours and a second calcining duration of 10 hours at the same temperature, the compound composition percentages of undoped intermediate-state sorbents obtained are 89.82% by weight of LMO, 8.92% by weight of $Mn_2O_3$ and 1.26% by weight of $Mn_3O_4$. At 525° C., for an initial calcining duration of 5 hours and a second calcining duration of 10.0 hours at the same temperature, the compound composition percentages of undoped intermediate-state sorbents obtained are 91.38% by weight of LMO, 8.09% by weight of $Mn_2O_3$ and 0.53% by weight of LiOH monohydrate. At 525° C., for an initial calcining duration of 15 hours and a second calcining duration of 10 hours at the same temperature, the compound composition percentages of undoped intermediate-state sorbents obtained are 92.23% by weight of LMO, 7.16% by weight of $Mn_2O_3$, 0.33% by weight of $Mn_3O_4$, and 0.28% by weight of LiOH. At 650° C., for an initial calcining duration of 5 hours and a second calcining duration of 10 hours for the same temperature, the compound composition percentages of undoped intermediate-state sorbents obtained are 92.09% by weight of LMO, 7.76% by weight of $Mn_2O_3$ and 0.15% by weight of LiOH monohydrate.

In some embodiments, the first calcining step may not synthesize a pure LMO. By varying the duration of the reaction and/or temperature, some or all the reactants may be eliminated from the blend. The presence of the reactants in the precursor blend, and some intermediate products, such as $Mn_2O_3$, are formed during synthesis. A second calcination step may be performed to further reduce the presence of the constituents of the intermediate-state sorbent other than the LMO spinel, leading to higher-purity LMO. In some embodiments, LMO spinel formation may involve multiple reaction steps forming an intermediate-state sorbent blend of intermediates not present in the precursor blend, for example, $Mn_2O_3$ when a $Mn_3O_4$ reactant is present in the precursor blend. In some embodiments, the first calcination at 525° C. for five (5) hours may not result in the desired phase-formation or crystal-structure optimization (or at least improvement relative to LMOs formed by other techniques) of the LMO. A second calcination step at 525° C. for ten (10) hours allows for further phase transformation and crystallization, leading to the formation of the desired LMO spinel phase with the optimal (or at least an improved relative to other LMO spinel phases) crystal structure and loading capacity.

In yet another embodiment, the second calcination step can promote better mixing and homogenization of the precursor materials, ensuring uniform distribution of lithium, manganese, and oxygen throughout the LMO particles.

FIG. 9 is a table illustrating the respective quantities of intermediate-state sorbent blend obtained at a calcining temperature of 525° C. at different time intervals during the second calcining duration as described in the method for manufacturing a LMO sorbent spinel from FIG. 2, according to some embodiments of the present disclosure. At 525° C., for 0.5 hours, 83.24% by weight of LMO, 16.67% by weight of $Mn_2O_3$, 0.06% of $Mn_3O_4$, and 0.02% of LiOH monohydrate are obtained. At 525° C., for two (2) hours, 89.82% by weight of LMO, 8.92% by weight of $Mn_2O_3$, and 1.26% of $Mn_3O_4$ are obtained (little or no (0%) $LiOH \cdot H_2O$ is obtained). At 525° C., for five (5) hours, 91.38% by weight of LMO and 8.09% by weight of $Mn_2O_3$ and 0.53% of LiOH monohydrate are obtained (little or no (0%) $Mn_3O_4$ is obtained). At 525° C., for fifteen (15) hours, 92.23% by weight of LMO and 7.16% by weight of $Mn_2O_3$, 0.33% of $Mn_3O_4$, and 0.28% of LiOH monohydrate are obtained.

The purity of the reactants within the precursor blend can influence the crystal structure and morphology of LMO spinel. Purity, in the context of chemical reactants, refers to the proportion of the desired substance within a sample, free from any undesired contaminants or substances. Impurities, therefore, constitute any trace to substantial volumes of compounds, ions, or elements that are not the intended reactants or products within the precursor blend. These can originate from various sources during the manufacturing, handling, or storage processes and may include other chemicals used in production, environmental contaminants, or residues from the synthesis process itself. Most often, these impurities are found along with the necessary reactants intended for the precursor blend. The presence of these impurities, even in small quantities, can significantly influence the chemical reactions, leading to the formation of secondary phases, altering the stoichiometry of the LMO lattice structure, and ultimately affecting the spinel sorbent's properties such as the accessibility of lithium ions.

Purity, in the context of the sorbent blend comprising lithium manganese oxide (LMO), typically is a critical parameter that denotes the percentage of the desired sorbent spinel, along with other constituents, within the intermediate-sorbent blend. This concept of purity is particularly pivotal when aiming for a biased yield of LMO to be synthesized within a specific reaction duration and, in certain embodiments, at predetermined temperatures. Achieving the desired level of purity in the sorbent blend typically ensures that the subsequent reactions and processes yield LMO with the intended structural and chemical properties, optimizing (or at least improving relative to other formation techniques) its performance as a sorbent. FIG. 9 data suggests that the purity of the LMO spinel was maximized between five (5) and fifteen (15) hours at 525° C. during the second calcination.

Upon activation of the sorbent, such as LMO, any intermediate-sorbent constituents that are extraneous to the desired outcome are often removed, enhancing the purity of the resultant product. For activated sorbents, purity thus can be defined as the percentage of LMO that has undergone conversion to hydrogen manganese oxide (HMO), reflecting the efficiency of the activation process. In essence, a high-purity activated LMO is indicative of a substantial conversion to HMO, quantified by the percentage of HMO by weight within the blend. This measure of purity can be crucial, as it can directly impact the spinel sorbent's efficacy and suitability for its intended applications, particularly where specific sorbent characteristics are required for optimal (or at least for improvement relative to other sorbents) performance. Therefore, controlling the purity of the sorbent blend not only dictates the quality of the LMO produced but also ensures (or at least significantly improves the chances of) the success of the targeted reactions and the functional integrity of the activated sorbent in its application context.

FIG. 10 is a table illustrating the loading capacity of LMO sorbent spinel as described in the method for manufacturing an LMO sorbent spinel from FIG. 5, according to some embodiments of the present disclosure. The table contents represent the impact temperature, duration of the reacting step, reactants, and a second reacting step have on the loading capacity of the resulting LMO. By varying each of one or more of the duration, temperature, duration of the reacting step, reactants, or a second reacting step, different amounts of LMO, intermediate compound, or reactants present within the precursor blend can be biased to preferred amounts. In particular, in this exemplary instance calcining, the duration and temperature of the reacting can be modified in a second calcining event of duration and temperature to achieve a desired loading capacity.

The formation of LMO spinel at rather high purities, e.g., above 90% purity by weight, can be accomplished by calcining reactants like $Mn_3O_4$ and LiOH monohydrate at a lower temperature for relatively brief durations of five (5) hours. This synthesis technique allows a commercially available manganese compound to be chemically converted to an intermediate compound, like $Mn_2O_3$. In some experiments, the formation of the intermediate $Mn_2O_3$ compound in the presence of a precursor blend of $Mn_3O_4$ and LiOH monohydrate may facilitate the formation of the LMO spinel. Converting $Mn_3O_4$ to a volume of $Mn_2O_3$ compound during the calcining process also produces a spinel sorbent within a relatively short duration of five (5) hours. This represents a reduction in total calcination duration by 66% over conventional sorbent synthesis techniques. The present technique suggests that this method of utilizing an available compound for converting the compound in the presence of a precursor blend is feasible and effective for synthesizing a spinel sorbent.

Returning to FIG. 10, experiments No. 1-6 were conducted using a precursor blend of LiOH monohydrate ($LiOH \cdot H_2O$) and a high-grade $Mn_3O_4$ source, while experiment No. 7 was conducted using a precursor blend of lithium carbonate ($Li_2CO_3$) and a high-grade $Mn_3O_4$ source. Typical of a higher grade $Mn_3O_4$ source, the high-grade $Mn_3O_4$ source comprised a lower volume of iron (e.g., percent by weight of less than 0.7) and availability of Mn in % by weight equal to or greater than 71% of overall weight. In general, calcining temperatures of approximately 525° C. synthesized an LMO (e.g., a spinel LMO compound chemical formula best match of $Li_{1.33}Mn_{1.66}O_4$ as determined using XRD) yielding higher loading capacities, while a second calcination generally increased the loading capacity of the activated LMO (e.g., an HMO) at the end of the second calcination event. Milling was performed between the initial and second calcinations.

TABLE 2

Ion Concentrations in the Synthetic Brine Solution

| Ion | Li+ | Na+ | K+ | Cl- | HCO3- |
|---|---|---|---|---|---|
| Concentration (mg/L) | 13 | 55 | 787 | 780 | 145 |

Loading capacity was measured on the intermediate-state sorbent and again after a second calcining period. A loading test was performed on the sorbent using a synthetic brine.

The brine solution is defined in Table 2. Loading tests were conducted with 200 mL of brine solution and approximately 0.1 g of activated sorbent. This ratio is intended to supply an excess of lithium, allowing an accurate determination of the loading capacity. Samples were mixed for approximately one hour before collecting the depleted brine samples. Various other methodologies for assessing the absorption of the sorbent can be used to assess the loading capacity of a sorbent. It is acknowledged that the loading capacities determined through these tests may be influenced by the constituents of the testing brine. Components such as competing ions, pH levels, and the presence of organic compounds or other metals within the brine solution can impact, significantly, the sorbent's lithium uptake. These interactions may lead to reduced loading capacities, highlighting the importance of considering the specific composition of the brine when evaluating sorbent performance. Additionally, the testing conditions, such as the contact time between the sorbent and the brine, temperature, and sorbent-to-brine ratio, can be critical factors that can affect the outcome of the loading capacity tests. As such, optimizing (or at least improving relative to other formation techniques) these parameters based on the characteristics of both the sorbent and the brine solution can be important, even essential, for achieving an accurate determination of loading capacity, ensuring (or at least improving the odds) that the findings are representative of real-world applications.

Experiments No. 1-5 and 7 had an initial calcination and second calcination temperature of 525° C., while the duration of each experiment was varied. In experiment No. 1, an initial calcining duration of 0.5 hours was conducted, followed by a second calcining duration of 0.5 hours, yielding an LMO with a lithium loading capacity of 10.2 mg/g of activated LMO. In experiment No. 2, an initial calcining duration of two (2) hours followed by a second calcination duration of two (2) hours yielded an LMO with an activated lithium loading capacity of 13.2 mg/g of activated LMO. In experiment No. 3, an initial calcining duration of two (2) hours was followed by a second calcination duration of ten (10) hours, yielding an LMO with an activated lithium loading capacity of 9.2 mg/g of LMO. In experiment No. 4, an initial five-hour calcination was followed by a second ten-hour (10-hour) calcination, yielding an activated LMO with a lithium loading capacity of 15.9 mg/g of activated LMO. In experiment No. 5, an initial fifteen-hour (15-hour) calcination followed by a second ten-hour (10-hour) calcination yielded an LMO with an activated lithium loading capacity of 14.5 mg/g of activated LMO. Experiment No. 7 was conducted with a lithium carbonate and $Mn_3O_4$ precursor blend. The experiment included an initial five-hour (5-hour) calcining duration followed by a second ten-hour (10-hour) calcination, yielding an activated LMO with a lithium loading capacity of 23.9 mg/g of activated LMO.

Experiment No. 6 was conducted at a higher calcination temperature of 650° C. during the initial five-hour (5-hour) calcination, followed by a second calcination period of ten (10) hours, yielding an LMO with an activated lithium loading capacity of 6.7 mg/g of activated LMO. As described in FIG. 10, the highest loading capacity of 23.9 mg/g lithium in activated LMO is achieved by calcining for five (5) hours during the first calcination, followed by a ten-hour (10-hour) calcination during the second firing at 525° C. The data obtained in the table of FIG. 10 further signifies that none of the firing combinations using LiOH monohydrate achieved as high of a loading capacity of the activated LMO as when $Li_2CO_3$ was a reactant and constituent of the precursor blend.

In another embodiment, the method of calcining the precursor blend at 525° C. for five (5) hours looks in ambient atmosphere may form LMO via a one step, cost-effective and scalable method of synthesis of an LMO spinel. Referring again to the flow chart of FIG. 5, at 510, the precursor blend may be a 0.70 to 0.85 ratio of lithium to manganese blend. Step 520 includes calcining the precursor blend of step 510 for an initial calcining duration and at a first temperature to form an intermediate-state sorbent blend of at least $Mn_2O_3$ and an LMO. In the subsequent step 530, the resultant intermediate sorbent is milled to achieve particle-size reduction and homogenization of the intermediate-sorbent format size. At step 540, the milled intermediate sorbent of step 530 is subjected to calcination for the second time for a second duration and temperature, thereby synthesizing a sorbent blend. The resultant sorbent blend of step 540 undergoes activation with an acid at step 550, wherein the sorbent is activated to reach an activation percentage of at least 65% activation to form an activated LMO sorbent (e.g., an HMO). The LMO may have a lithium loading capacity of at least 5.0 mg/g of activated LMO at standard temperature and pressure for an initial calcination of approximately two (2) hours at 525° C. using a 3:4 ratio of lithium-to-manganese precursor blend. The activated sorbent blend comprises at least one species of HMO sorbent spinel.

In some embodiments, the intermediate-state sorbent blend of at least $Mn_2O_3$ and an LMO may further comprise 50% by weight $Mn_2O_3$, 10% by weight $Mn_3O_4$, and 25% by weight LMO. In some embodiments, the sorbent blend further comprises 96% by weight LMO. The activated sorbent blend comprises at least one species of HMO sorbent spinel, having a lithium loading capacity of at least 6.0 mg/g of HMO.

FIG. 11 is a table illustrating the impact of three different grades of $Mn_3O_4$ products used in the method for manufacturing an LMO sorbent spinel from FIG. 2, according to some embodiments of the present disclosure. In general, when reactants are purchased, these reactants often include additional impurities. Higher-grade reactant materials contain a high actual percentage by weight of the reactant, and as low as possible impurities, although not all impurities have the same impact on sorbent formation and/or loading capacity. For illustrative purposes, the content of iron (one of several impurities found within the purchased $Mn_3O_4$), was assessed to understand how the percentage of iron by weight of $Mn_3O_4$ impacts the loading capacity of LMO sorbent spinel. Each of Grade 1, Grade 2, and Grade 3 was calcinated twice using the same calcination schedule. Each of the compounds within the intermediate-state sorbent blend were determined by Rietveld refinement of XRD data, and the loading capacity of the activated LMO was assessed. For all three grades of $Mn_3O_4$, a first calcination of five hours was conducted at 525° C. followed by a second calcination of 10 hours at 525° C.

At 525° C. for an initial calcination of 5 hours, Grade 1 precursor yielded, 53.2% by weight of LMO, 6.11% by weight of $Mn_2O_3$, 38.27% of by weight of $Mn_3O_4$, and 2.42% of LiOH monohydrate. At the same temperature and duration of initial calcination, grade 2 precursor yielded 46.31% by weight of LMO and 3.33% by weight of $Mn_2O_3$, 46.31% by weight of $Mn_3O_4$, and 1.39% by weight of LiOH monohydrate and grade 3 precursor yielded, 94.42% by weight of LMO and 5.58% by weight of $Mn_2O_3$, during initial calcination. During the second calcination of 10 hours at 525° C., grade 1 precursor yielded 78.92% by weight of LMO and 11.34% by weight of $Mn_2O_3$, 6.58% by weight of $Mn_3O_4$, and 3.17% of LiOH monohydrate while grade 2 yielded, 81.59% by weight of LMO and 6.87% by weight of $Mn_2O_3$, 6.73% by weight of $Mn_3O_4$, and 4.81% of LiOH monohydrate; and grade 3 yielded, 91.38% by weight of LMO and 8/09% by weight of $Mn_2O_3$ and 0.53% of LiOH monohydrate during the same experimental period.

FIG. 11 further illustrates the loading capacities of different grades against the LMO spinel's respective iron content. Grade 1 precursor exhibited a loading capacity of 5.6 mg/g with 2.70% iron content within the $Mn_3O_4$ reactant. Grade 2 precursor exhibited a higher loading capacity of 6.9 mg/g with 1.7% of iron content within the $Mn_3O_4$ reactant, and Grade 3 precursor showed the highest lithium loading capacity among the 3 grades of precursor materials utilized for the experiment with a loading capacity of 15.9 mg/g and associated Fe content within the $Mn_3O_4$ reactant of 0.17% by weight of Grade 3 reactant. The data presented in FIG. 11 correlates lower iron content with higher loading capacity of the activated LMO spinel. The presence of iron as an impurity can impact the performance of the spinel, including its absorption or loading capacity for lithium in direct lithium extraction processes. Of note, other trace metals and compounds may also play a role in reducing LMO formation and ultimate loading capacity. Therefore, minimizing all impurities within the reactant source used in the precursor blend brings some predictability to the LMO weight synthesized and loading capacity performance of the sorbent at an industrial scale lithium extraction processes.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable-type medium such as a USB drive, a solid-state memory device, a hard-disk drive, a Compact Disc (CD), a Digital Video Disk (DVD), a digital tape, a computer memory, etc.; and a transmission-type medium such as a digital- and/or an analog-communication medium (e.g., a fiber-optic cable, a waveguide, a wired communications link, a wireless communication link (e.g., transmitter, receiver, transmission logic, reception logic), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only)), and/or electrical circuitry forming a communications device (e.g., a modem, communications switch, optical-electrical equipment). Those having ordinary skill in the art will recognize that the subject matter described herein may be implemented in an analog or digital fashion or some combination thereof.

Those skilled in the art will recognize that at least a portion of the devices and/or processes described herein can be integrated into a data-processing system. Those having ordinary skill in the art will recognize that a data-processing system generally includes one or more of a system unit housing, a video-display device, memory such as volatile or non-volatile memory, processors such as microprocessors or digital-signal processors, computational entities such as operating systems, drivers, graphical user interfaces, and applications programs, one or more interaction devices (e.g., a touch pad, a touch screen, an antenna), and/or control systems including feedback loops and control motors (e.g., feedback for sensing position and/or velocity; control motors for moving and/or adjusting components and/or quantities). A data-processing system may be implemented utilizing suitable commercially available components, such as those typically found in data computing/communication and/or network computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc., located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, alone, A and B together, A and together, B and together, and/or A, B, and together). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, alone, A and B together, A and together, B and together, and/or A, B, and C together). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for manufacturing a LMO sorbent spinel, the method comprising steps of:
   a. obtaining a precursor blend, wherein the precursor blend comprises a 3:4 molar ratio of lithium to manganese blend of LiOH monohydrate or $Li_2CO_3$ and $Mn_3O_4$;
   b. calcining the precursor blend for an initial calcining duration and at a first temperature, wherein at the end of the initial calcining duration the calcining forms an intermediate-state sorbent blend of at least $Mn_2O_3$ and an LMO; and
   c. calcining the intermediate-state sorbent blend for a second calcining duration and second calcining temperature thereby forming a sorbent blend.

2. The method of claim 1, wherein the initial calcining duration is at least two (2) hours.

3. The method of claim 2, wherein the first temperature is at least 500° C.

4. The method of claim 1, wherein the intermediate-state sorbent blend further comprises less than 2% by weight $Mn_3O_4$, less than 23% by weight $Mn_2O_3$, and at least 75% by weight LMO.

5. The method of claim 1, wherein the LMO of the intermediate-state sorbent blend has a lithium loading capacity of at least 4.5 mg/g of activated LMO.

6. The method of claim 1, wherein the second duration is at least two (2) hours and the second calcining temperature is approximately 525° C., wherein the sorbent blend further comprises less than 25% by weight $Mn_2O_3$, and at least 70% by weight LMO, wherein the LMO has a lithium loading capacity of at least 9.0 mg/g of activated LMO.

7. The method of claim 1, wherein the initial calcining duration is approximately five (5) hours, and the first temperature is approximately 650° C., wherein the formed intermediate-state sorbent blend further comprises at least 70% by weight LMO and at least 4.5% by weight $Mn_2O_3$; and the second duration is approximately ten (10) hours and the second calcining temperature is approximately 525° C., wherein the sorbent blend further comprises less than 0.5% by weight $Mn_3O_4$, less than 9% by weight $Mn_2O_3$, and at least 90% by weight LMO, wherein the LMO has a lithium loading capacity of at least 6.0 mg/g of activated LMO.

8. The method of claim 7, further comprising activating the sorbent blend, the activating comprising:
   a. mixing the sorbent with an acid;
   b. agitating the sorbent and the acid; and
   c. activating the sorbent to reach an activation percentage of at least 65% activation to form an activated sorbent.

9. A method for manufacturing an undoped activated LMO sorbent spinel, the method comprising steps of:
   a. obtaining a precursor blend, wherein the precursor blend is a 0.70 to 0.85 molar ratio of lithium to manganese blend of $Li_2CO_3$ and $Mn_3O_4$;
   b. calcining the precursor blend for an initial calcining duration and at a first temperature of at least 525° C., wherein the calcining forms an intermediate-state sorbent blend of at least $Mn_2O_3$ and an LMO;
   c. cooling the intermediate-state sorbent blend;
   d. calcining the cooled intermediate-state sorbent blend for a second duration of five (5) hours and a second temperature of at least 500° C. forming a sorbent blend; and
   e. activating the sorbent blend with an acid, wherein the activated sorbent blend comprises at least one species of HMO sorbent spinel.

10. The method of claim 9, wherein the intermediate-state sorbent blend comprises less than 0.1% by weight $Mn_3O_4$, less than 1% by weight $Mn_2O_3$, and at least 95% by weight LMO, wherein the LMO has a lithium loading capacity of at least 18.0 mg/g of activated LMO.

11. The method of claim 9, wherein the sorbent blend comprises less than 1% by weight $Mn_2O_3$, and at least 98% by weight LMO, wherein the LMO has a lithium loading capacity of at least 23.0 mg/g of activated LMO.

12. The method of claim 1, wherein the 3:4 molar ratio of lithium to manganese blend consists of LiOH monohydrate or $Li_2CO_3$ and $Mn_3O_4$.

13. The method of claim 1, wherein the 3:4 molar ratio of lithium to manganese blend consists essentially of LiOH monohydrate or $Li_2CO_3$ and $Mn_3O_4$.

14. The method of claim 12, wherein the $Mn_2O_3$ of the intermediate-state sorbent blend is formed by calcining the $Mn_3O_4$ of the precursor blend.

15. The method of claim 1, wherein the $Mn_2O_3$ of the intermediate-state sorbent blend is formed by calcining the $Mn_3O_4$ of the precursor blend.

* * * * *